United States Patent [19]
Nakajima et al.

[11] Patent Number: 5,738,183
[45] Date of Patent: Apr. 14, 1998

[54] MOTOR OPERATED POWER STEERING DEVICE

[75] Inventors: Terukazu Nakajima, Yamatotakada; Manabu Takaoka, Kashiba, both of Japan

[73] Assignee: Koyo Seiko Co., Ltd., Osaka, Japan

[21] Appl. No.: 658,125

[22] Filed: Jun. 4, 1996

[30] Foreign Application Priority Data

Jun. 14, 1995 [JP] Japan ................... 7-172734

[51] Int. Cl.$^6$ ................................................. B62D 5/04
[52] U.S. Cl. ........................... 180/444; 74/388 PS
[58] Field of Search ..................... 180/412, 413, 180/416, 429, 431, 433, 444; 74/388 PS, 412 TA

[56] References Cited

U.S. PATENT DOCUMENTS 4,967,858  11/1990  Kotake et al. ................. 180/444
5,454,438  10/1995  Chikuma ....................... 180/444

FOREIGN PATENT DOCUMENTS 3-128565  12/1991  Japan.
6-16856   5/1994   Japan.

*Primary Examiner*—Jesus D. Sotelo
*Attorney, Agent, or Firm*—Reid & Priest LLP

[57] ABSTRACT

In a motor operated power steering device, a drive shaft accommodation hole in a housing communicates with a opening for fitting a steering assistance power generation motor. In the accommodation hole, a drive shaft, which is driven by the motor, is supported by rolling bearings at two separate points along the axial direction. A steering shaft is linked to a driven gear which meshes with a driving gear provided around the outer circumference of the drive shaft. Around the outer circumference of the drive shaft, there is a ring shaped preload applying member, the outer circumference of which has a male threaded section. The preload applying member is screwed into a female threaded hole, which is concentric with the accommodation hole, in between the motor and the rolling bearing closest to the motor, so that it is able to apply preload along the axial direction to both rolling bearings.

4 Claims, 5 Drawing Sheets

MOTOR OPERATED POWER STEERING DEVICE

FIELD OF THE INVENTION

The invention relates to a motor operated power steering device in which the output of a motor for generating power to assist steering is transmitted by way of gears to the steering shaft.

DESCRIPTION OF THE RELATED ART

There is a conventional motor operated power steering device that comprises a housing having a motor fitting opening, a motor for generating power to assist steering, the motor being fitted to the housing so as to close the motor fitting opening, a drive shaft which can be rotated by the motor, a drive shaft accommodation hole formed in the housing so that it communicates with the motor fitting opening, rolling bearings which support the drive shaft in the accommodation hole at two separate points along the axial direction, a driving gear provided around the circumference of the drive shaft, a driven gear that meshes with the driving gear, and a steering shaft linked to the driven gear, wherein a boss on the side of the output shaft of the motor and the abovementioned drive shaft is linked to each other, so that the rotation of the motor is transmitted to the drive shaft through serrations formed on the inner circumference of the boss and on the outer circumference of the drive shaft.

In the conventional motor operated power steering device described above, axial displacement of the drive shaft resulting from vibration or the like gives rise to collision between the driving gear and the driven gear, so that noise arises.

This axial displacement of the drive shaft is inhibited by using high precision rolling bearings such as bearings with small internal gaps or four point contact bearings to support the drive shaft. This axial displacement of the drive shaft is also reduced by making the backlash between the driving gear and the driven gear as small as possible.

However, it is expensive to use high precision bearings as rolling bearings to support the drive shaft. Furthermore, reducing the backlash between the driving gear and the driven gear causes the additional effect of preventing the steering wheel from returning smoothly to the straight driving position on completion of a steering operation.

There is a conventional motor operated power steering device, which has a preload applying member screwed into the housing to apply axial preload to the two rolling bearings in order to prevent the drive shaft from the axial displacement (Japanese Utility Model Laying Open Gazette H3-128565). To be more precise, the preload applying member has a form of a bolt which is screwed into the housing from one side opposite to the other side where the motor is located. The preload is applied by pressing the rolling bearing located at one side opposite to the motor side by means of one end of the preload applying member via a spacer. The other end of the preload applying member projects outside the housing, and a lock nut is screwed on the outer circumference of the projecting portion.

However, when the preload applying member is screwed into the housing from one side opposite to the motor side, the direction from which the motor is fitted to the housing and the direction from which the preload applying member is fitted to the housing are opposite to each other. This means that the operator who carries out the assembly work is obliged to change his/her orientation in the assembly line in order to complete his/her work, and thus the assembly work is complicated.

Again, the inside diameter of the female threaded hole, into which the bolt shaped preload applying member is screwed, is smaller than the inside diameter of the drive shaft accommodation hole. Thus, when the preload applying member is screwed into the housing from one side opposite to the motor side, the drive shaft accommodation hole has to be machined from the other side where the motor fitting opening of the housing is located. On the other hand, the female threaded hole, into which the preload applying member is screwed, is located at one side opposite to the other side where the motor fitting opening is located. Therefore, when the female threaded hole is machined from the other side where the motor fitting opening is located, a long cutting tool must be used, otherwise the female threaded hole must be machined from one side opposite to the other side where the motor fitting opening is located. This reduces the precision of concentric machining between the drive shaft accommodation hole and the female threaded hole, so that the uniform application of the preload in the radial direction becomes difficult.

Furthermore, since the other end of the preload applying member and the lock nut project outside the housing, there is also a possibility that forces acting to those from outside the housing cause the preload applying member to be loosed.

Again, when the drive shaft is rotated relative to the boss on the side of the output shaft of the motor by vibration or the like, the teeth that form the serration on the inner circumference of the boss and the teeth that form the serration on the outer circumference of the drive shaft collide with each other, so that noise arises. To solve this problem, there is a motor operated power steering device, which has an O ring fitted between the inner circumference of the boss and the outer circumference of the drive shaft as a means of creating frictional resistance in order to restrain the relative rotation of the boss and the drive shaft (Japanese Examined Utility Model Publication Gazette H6-16856).

However, even if the O ring is fitted between the inner circumference of the boss and the outer circumference of the drive shaft as a means of creating frictional resistance in order to the relative rotation of the boss and the drive shaft, as the result of wear of the teeth that form the serrations on the inner circumference of the boss and on the outer circumference of the drive shaft following a long period of use, noise arises by the colliding between the teeth on the boss and the teeth on the drive shaft.

It is the object of the present invention to provide a motor operated power steering device that resolves the problems outlined above.

SUMMARY OF THE INVENTION

A motor operated power steering device of the present invention comprises a housing having a motor fitting opening, a motor for generating power to assist steering, the motor being fitted to the housing so as to close the motor fitting opening, a drive shaft which can be rotated by the motor, a drive shaft accommodation hole formed in the housing so that it communicates with the motor fitting opening, rolling bearings for supporting the drive shaft at two separate points along the axial direction in the drive shaft accommodation hole, a driving gear provided around the circumference of the drive shaft, a driven gear that meshes with the driving gear, a steering shaft linked to the driven gear, and a preload applying member screwed into the housing so that a preload can be applied to the rolling bearings along the axial direction, wherein the preload applying member is formed in the shape of a ring around the outside of the drive shaft, a male threaded section is formed around the outer circumference of the preload applying member, the preload applying member is screwed into a female threaded hole, which is formed concentrically with the drive shaft accommodation hole in the housing, in the space between the motor and the rolling bearing closest to the motor, and a lock nut is screwed onto the male threaded section around the outer circumference of the preload applying member.

In the motor operated power steering device of the present invention, preload is applied by the preload applying member to the rolling bearings supporting the drive shaft along the axial direction of the drive shaft. This prevents the drive shaft from displacement in the axial direction, so that it is possible to prevent noise arising. This makes it unnecessary to use high precision bearings as the rolling bearings supporting the drive shaft, thereby helping to reduce the overall cost. Moreover, since there is no need to make the backlash between the driving gear and the driven gear any smaller than necessary, it is possible to return the steering wheel smoothly to the straight driving position on completion of a steering operation.

The ring shaped preload applying member around the drive shaft is located in between the motor and the rolling bearing closest to the motor. This makes it possible for the operator on the assembly line to fit both the motor and the preload applying member to the housing from the same direction. By relieving the operator of any need to change his/her physical orientation while fitting these parts, the assembly operation is performed easily.

Once the motor is fitted, the preload applying member does not project outside the housing. This prevents a force from acting on the preload applying member from outside the housing, so that the preload applying member is prevented from being loosed. Furthermore, the lock nut, which is screwed onto the male threaded section around the outer circumference of the preload applying member, does not project outside the housing after the motor is fitted. This more certainly prevents the preload applying member from being loosed by a force acting from outside the housing.

It is preferable that the inside diameter of the female threaded hole is equal to or greater than the inside diameter of the drive shaft accommodation hole.

The male threaded section around the outer circumference of the preload applying member can thus be screwed into the female threaded hole, which is concentric with the drive shaft accommodation hole, from the side where the motor is located. Furthermore, the inside diameter of the female threaded hole is equal to or greater than the inside diameter of the drive shaft accommodation hole, so that the female threaded hole and the drive shaft accommodation hole can be machined from the same side without the use of a long cutting tool. This enables the precision of concentric machining between the two holes to increase, so that the preload can be applied uniformly in the radial direction.

It is preferable that the boss on the motor output shaft side and the drive shaft are linked so that transfer of rotation between the boss and the drive shaft is allowed by way of teeth formed around the inner circumference of the boss and the outer circumference of the drive shaft, a sealing member is provided to seal the gap between the inner circumference of the boss and the outer circumference of the drive shaft at a point outside the area in which the teeth are located in the boss, a closed space is formed inside the sealing member in the boss, and the closed space is filled with grease.

By providing a sealing member into the gap between the inner circumference of the boss on the motor output shaft side and the outer circumference of the drive shaft, it is possible to restrain relative rotation between the boss and the drive shaft by means of frictional resistance. This enables the elimination of the noise generated by the collision between the teeth around the inner circumference of the boss and the teeth around the outer circumference of the drive shaft. Moreover, by filling the closed space formed in the boss inside the sealing member with grease, it is possible to ensure that the grease is always present in the gap between the teeth around the outer circumference of the drive shaft and the teeth around the inner circumference of the boss. Thus, the colliding between the teeth can be prevented, with increasing wear resistance of the teeth over a long period, so that it is possible to significantly reduce the noise due to the colliding.

DETAILED DESCRIPTION OF THE PREFERRED EMBODIMENT

There follows a detailed description of the preferred embodiment of the present invention by reference to the drawings.

Figure 1:
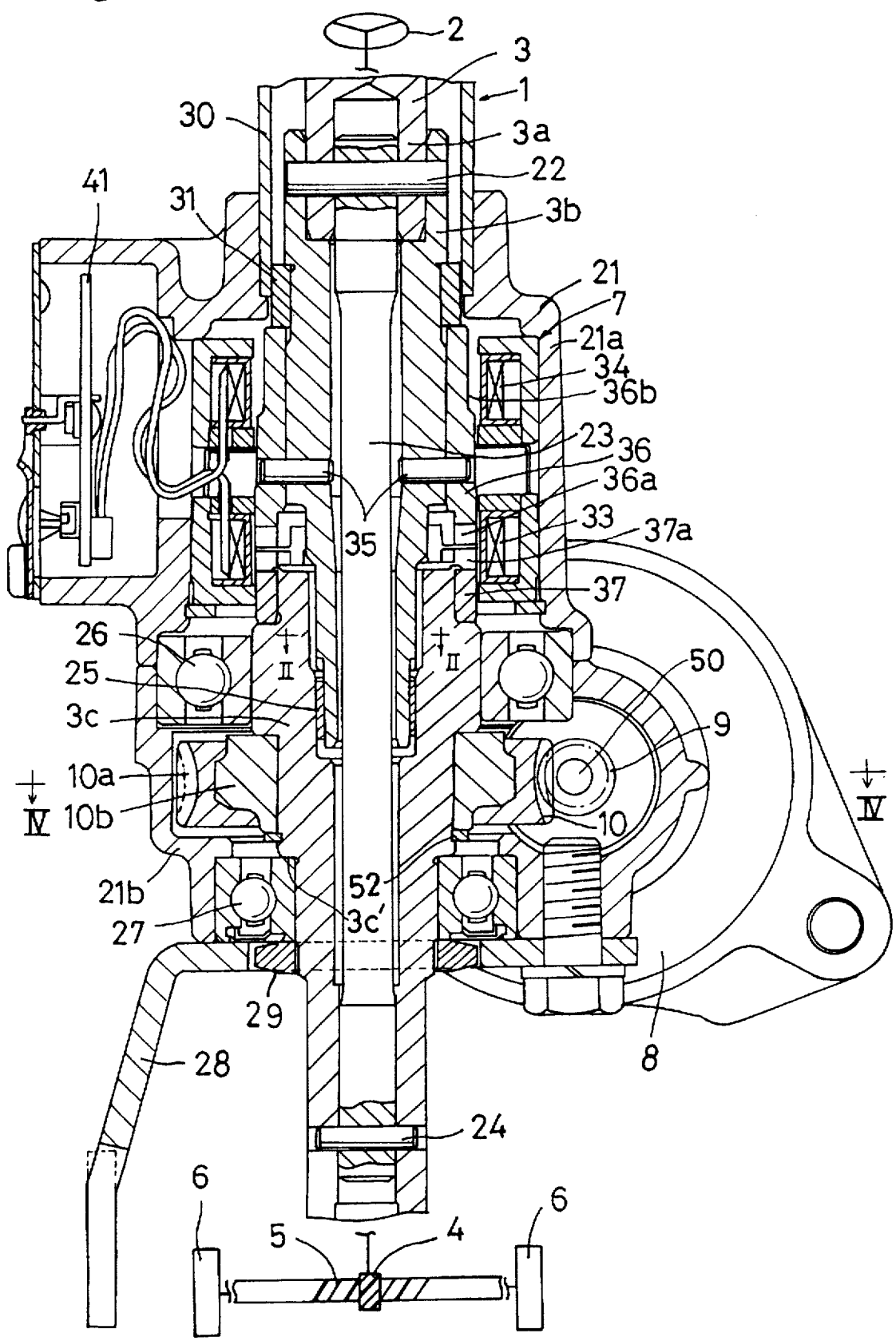
FIG. 1: A cross sectional view of an embodiment of the motor operated power steering device of the present invention.

The motor operated power steering device 1 shown in FIG. 1 transmits steering torque, which is generated by turning the steering wheel 2, by way of a steering shaft 3 to a pinion 4. The transmission of the steering torque causes movement in a rack 5 which meshes with the pinion 4. This varies the steering angle of the road wheels 6 which are linked to the rack 5 by way of tie-rods, knuckle arms, and the like (omitted from the drawing).

To supply steering assistance force in accordance with the steering torque transmitted by the steering shaft 3, a torque sensor 7 which detects the steering torque, a steering assistance motor 8 which is driven in accordance with the detected steering torque for generating power to assist steering, a worm (driving gear) 9 whose function is to transmit the rotational force of the motor 8 to the steering shaft 3, and a worm wheel (driven gear) 10 which meshes with the worm 9 are provided.

The torque sensor 7 has a housing 21 which covers the abovementioned steering shaft 3. The housing 21 is made by joining two individual members 21a, 21b. Inside the housing 21, the steering shaft 3 is divided into a first shaft section 3a which is linked to the steering wheel 2, a cylindrical second shaft section 3b which is linked by a pin 22 to the first shaft section 3a, and a cylindrical third shaft section 3c which is connected to the second shaft section 3b by way of a bush 25 fitted around the outer circumference of the second shaft section 3b such that it is able to rotate relative to the second shaft section 3b. A torsion bar 23 is fitted through the center of the three shaft sections 3a, 3b, 3c as an elastic member.

The torsion bar 23 is linked at one end by the abovementioned pin 22 to the first and second shaft sections 3a, 3b and at the other end by another pin 24 to the third shaft section 3c. This configuration enables the second and third shaft sections 3b, 3c to rotate elastically relative to each other in accordance with the steering torque.

Figure 2:
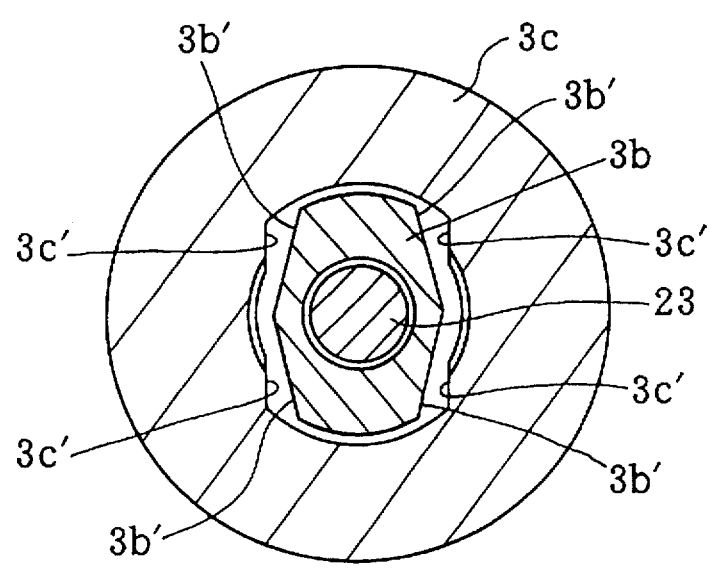
FIG. 2: A cross sectional view taken on line II—II of FIG. 1.

As shown in FIG. 2, parts of the outer circumference of the second shaft section 3b and parts of the inner circumference of the third shaft section 3c are made up of mutually opposed non-circular sections 3b', 3c'. By coming into contact with each other, the non-circular sections 3b' of the second shaft section 3b and the non-circular sections 3c' of the third shaft section 3c have the effect of confining the relative rotation of the two shafts 3b; 3c within a fixed range. Limiting the relative rotation in this way has the effect of preventing the torsion bar 23 from being damaged by the application of excessive torque to the steering shaft 3.

The second shaft section 3b is supported by way of a bush 31 by the steering column 30, which is forced into the housing 21. The third shaft section 3c is supported at two separate points along the axial direction by two ball bearings 26, 27 which are fitted into the housing 21. The inner ring of one of the ball bearings 27 slots in between the part 3c' where the third shaft section 3c widens out and a nut 29, which is screwed onto the third shaft section 3c. This serves to inhibit axial displacement of the third shaft section 3c with respect to the housing 21. The housing 21 is secured to the car body by a bracket 28.

The worm wheel 10 is forced fitted onto the outer circumference of the third shaft section 3c. The worm wheel 10 is configured as a single unit by synthetic resin teeth 10a forming its outer circumference and a metal sleeve 10b forming its inner circumference. The worm 9, which meshes with the worm wheel 10, is formed around the outer circumference of a drive shaft 50 so as to be integrated with the drive shaft 50. The drive shaft 50 can be rotated by the motor 8. The worm 9 is made of steel with a nitrided surface.

The torque sensor 7 has a first detection coil 33 and a second detection coil 34 each of which is supported by the housing 21, a first magnetic detection ring 36 which is fitted around the outer circumference of the second shaft section 3b and is fixed by a pin 35 to the second shaft section 3b, and a second magnetic detection ring 37 which is forced on the outer circumference of the third shaft section 3c. The first and second detection rings 36, 37 are positioned such that one end face of the first detection ring 36 and one end face of the second detection ring 37 are opposite to each other. A plurality of teeth 36a, 37a are provided around the circumferences of their opposing end faces of the two detection rings 36, 37. In the first detection ring 36, the outer circumference adjacent to the other end face has a narrow diameter part 36b whose diameter is narrower than the diameter of the outer circumference adjacent to the one end face. The first detection coil 33 surrounds the gap between the opposing end faces of the first and second detection rings 36, 37. The second detection coil 34 surrounds the first detection ring 36. Each of the two detection coils 33, 34 are connected by wires to a printed circuit board 41 attached to the housing 21.

Figure 3:
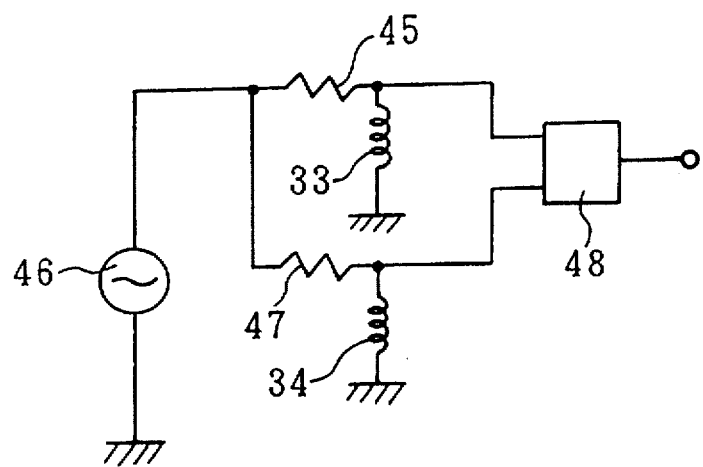
FIG. 3: A drawing illustrating the configuration of the torque sensor circuit of an embodiment of the motor operated power steering device of the present invention.

The printed circuit board 41 contains the signal processing circuit shown in FIG. 3. To be more precise, the first detection coil 33 is connected to an oscillator 46 by way of a resistance 45. The second detection coil 34 is also connected to the oscillator 46 by way of a resistance 47. Each of the first and second detection coils 33, 34 are connected to a differential amplifier 48. This configuration ensures that, when the torsion bar 23 twists in response to the transmission of torque, the first and second detection rings 36, 37 rotate relative to each other. This relative rotation causes the opposing areas of the teeth 36a, 37a on the first and second detection rings 36, 37 to change in axial direction. This change causes a change of the magnetic reluctance in the gap between the opposing teeth 36a, 37a with respect to the magnetic flux of the first detection coil 33. The output of the first detection coil 33 changes in line with this change of the magnetic reluctance. The transmitted torque is detected from this output. The second detection coil 34 is positioned so as to face the narrow diameter part 36b of the first detection ring 36. The diameter of the narrow diameter part 36b is determined such that, when there is no steering torque, the magnetic reluctance with respect to the magnetic flux of the second detection coil 34 is equal to the magnetic reluctance with respect to the magnetic flux of the first detection coil 33. Therefore, fluctuations in the output of the first detection coil 33 due to change of temperature are made equal to the fluctuations in the output of the second detection coil 34 due to the change of temperature, so that the fluctuations in the output of the first detection coil 33 is canceled out by the differential amplifier 48. In other words, fluctuations due to change of temperature in the detected value of the transmitted torque are compensated for. The abovementioned motor 8 is driven in response to signals corresponding to the transmitted torque output by the differential amplifier 48. The output of the motor 8 is applied as steering assistance force to the steering shaft 3 by way of the abovementioned worm 9 and worm wheel 10.

Figure 4:
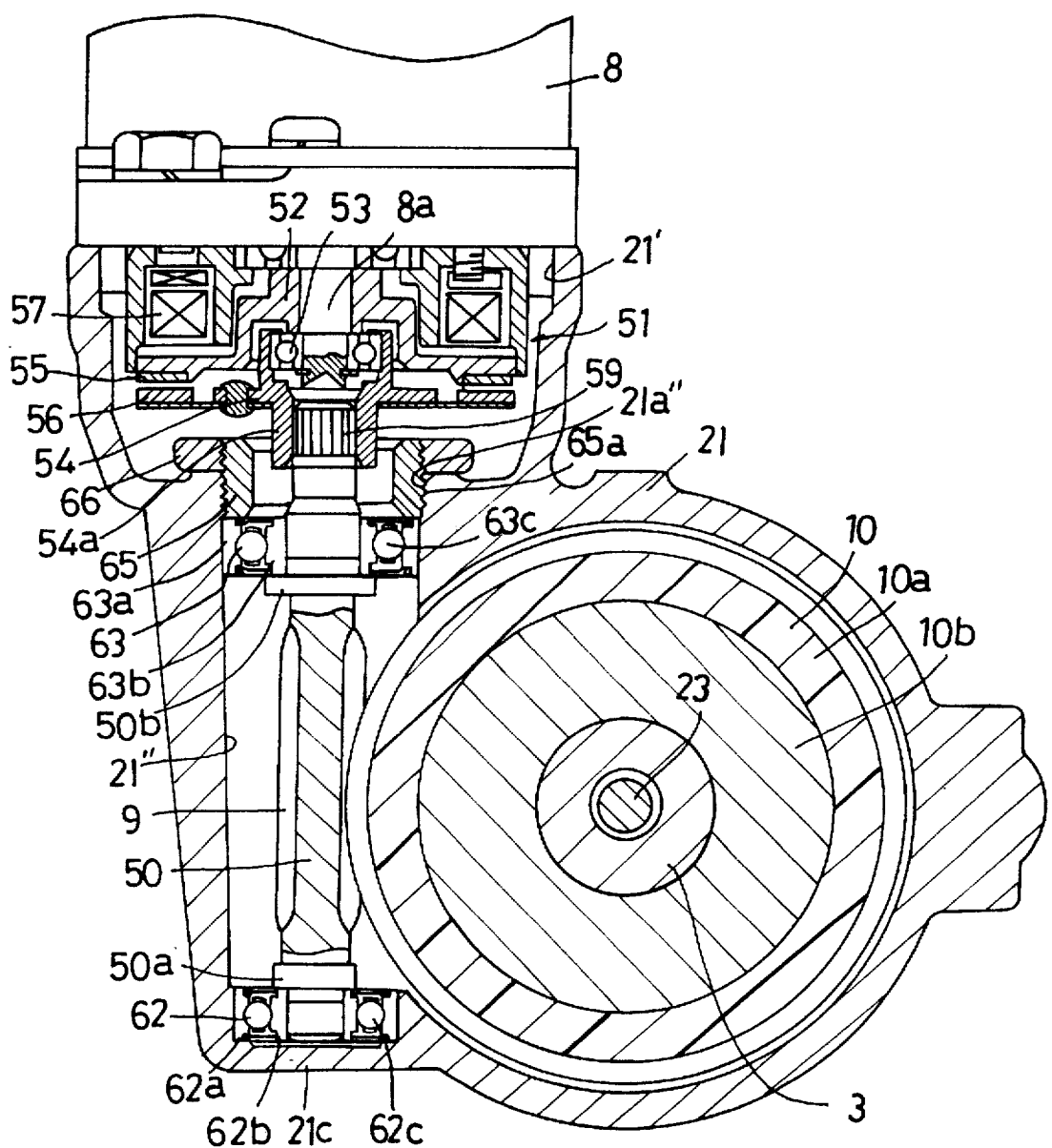
FIG. 4: A cross sectional view taken on line IV—IV of FIG. 1.

As shown in FIG. 4, the abovementioned housing 21 has a motor fitting opening 21'. The abovementioned steering assistance motor 8 is fitted to the housing 21 by bolts so as to close the opening 21'. The output shaft 8a of the motor 8 is connected to an electro-magnetic clutch 51. More specifically, the output shaft 8a is integrated with a driving member 52 of the electro-magnetic clutch 51, with being linked to a driven member 54 of the clutch 51 through a ball bearing 53 so as to be able to rotate relatively. A friction plate 55 fitted to the driving member 52 and a friction plate 56 fitted to the driven member 54 are connected to each other by exciting a solenoid 57 and disconnected by terminating the excitation of the solenoid 57.

Figure 5:
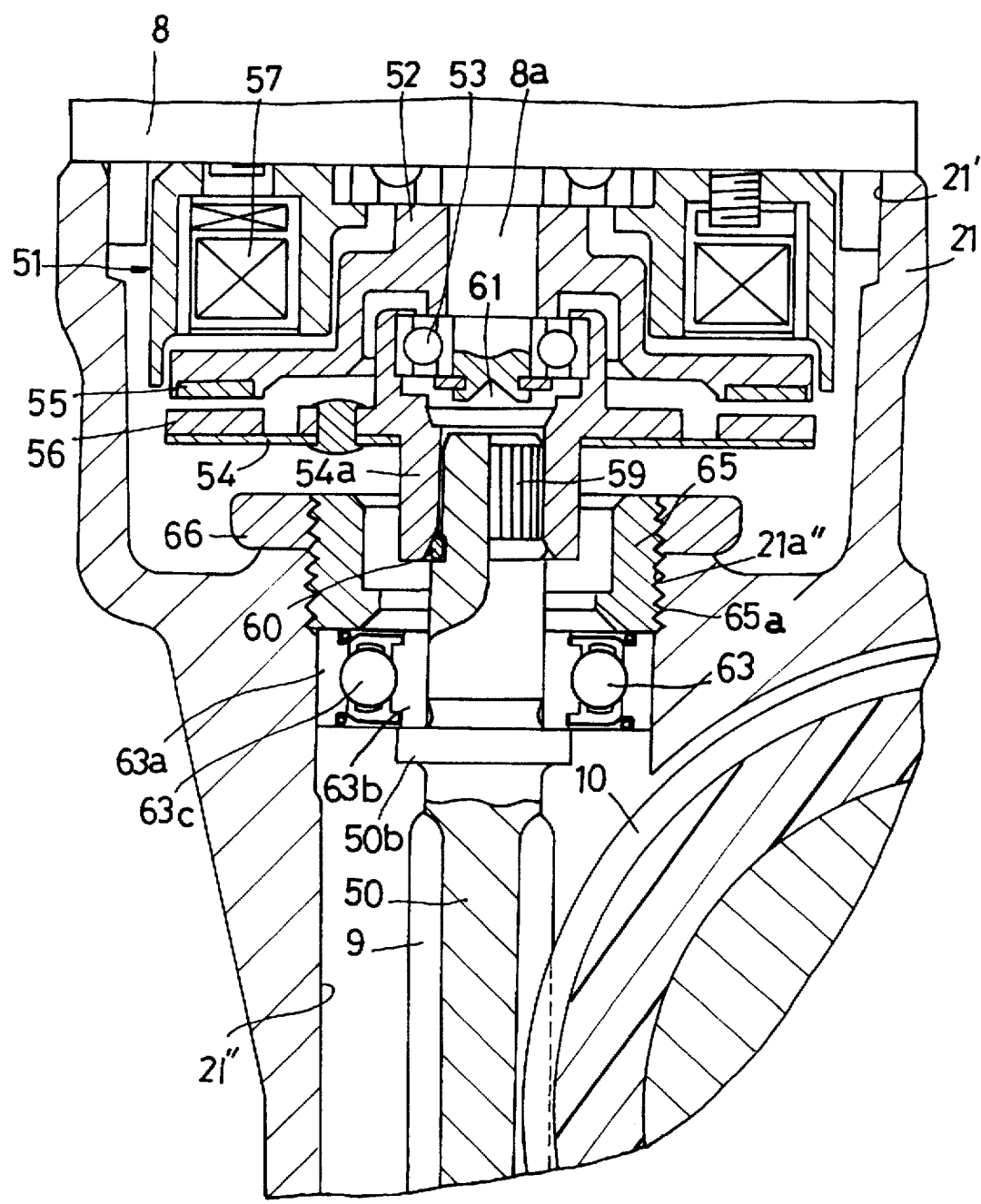
FIG. 5: A cross sectional view of the main part of an embodiment of the motor operated power steering device of the present invention.

The driven member 54, which is located on the same side where the output shaft 8a of the motor 8 is located, has a boss 54a. The boss 54a on the motor output shaft side and the abovementioned drive shaft 50 are linked through teeth of serrations 59, which are formed around the inner circumference of the boss 54a and the outer circumference of the drive shaft 50, so that transfer of rotation between the boss 54a and the drive shaft 50 is allowed. As shown in FIG. 5, an O ring 60 is provided to seal the gap between the inner circumference of the boss 54a and the outer circumference of the drive shaft 50 at a point outside the area where the teeth of the serrations 59 are located in the boss 54a. A closed space 61 surrounded by the O ring 60, the drive shaft 50, the boss 54a, the output shaft 8a of the motor 8, and the ball bearing 53 is formed inside the O ring 60 in the boss 54a. The closed space 61 is filled with grease.

A drive shaft accommodation hole 21" is formed in the housing 21 such that it communicates with the abovementioned motor fitting opening 21'. The drive shaft 50 is supported by rolling bearings 62, 63 at two separate points along the axial direction in the drive shaft accommodation hole 21". In the present embodiment, deep slot ball bearings are used as the rolling bearings 62, 63. At one side opposite to the other side where the motor 8 is located, one end of the drive shaft accommodation hole 21" is closed by the wall 21c of the housing 21. The outer ring 62a of the rolling bearing 62 furthest away from the motor 8 contacts with the wall 21c that closes the end of the drive shaft accommodation hole 21". The inner ring 62b of the rolling bearing 62 contacts with a first flange 50a, which is formed around the outer circumference of the drive shaft 50. The outer ring 63a of the rolling bearing 63 closest to the motor contacts directly with a preload applying member 65 described later. The inner ring 63b of the rolling bearing 63 contacts with a second flange 50b, which is formed around the outer circumference of the drive shaft 50.

The preload applying member 65 has a shape of a ring around the drive shaft 50. A male threaded section 65a is formed around the outer circumference of the preload applying member 65. The preload applying member 65 is screwed into a female threaded hole 21a", which is formed concentrically with the drive shaft accommodation hole 21" in the housing 21, via the male threaded section 65a. The inside diameter of the female threaded hole 21a" is equal to or greater than the inside diameter of the drive shaft accommodation hole 21". A lock nut 66 is screwed onto the male threaded section 65a of the outer circumference of the preload applying member 65. The lock nut 66 is pressed against the housing 21 to prevent the preload applying member 65 from rotating. Before fitting the motor 8 to the housing 21, the preload applying member 65 and the lock nut 66 are inserted into the housing 21 through the above-mentioned motor fitting opening 21' so as to be located between the motor 8 and the rolling bearing 63 closest to the motor 8.

By the preload applying member 65 screwed into the housing 21, the outer ring 63a of the rolling bearing 63 closest to the motor 8 can be pressed along the axial direction of the drive shaft 50. The pressing force applied to the outer ring 63a is transmitted by way of balls 63c to the inner ring 63b. This causes the inner ring 63b to be pressed against the second flange 50b, which is formed around the circumference of the drive shaft 50. The pressing force is subsequently transmitted from the second flange 50b by way of the first flange 50a to the inner ring 62b of the rolling bearing 62 furthest away from the motor 8. The pressing force is then transmitted by way of the ball 62c from the inner ring 62b to the outer ring 62a. The outer ring 63a is thus pressed against the wall 21c of the housing 21, so that preload can be applied to both bearings 62, 63.

In the above configuration, preload is applied along the axial direction of the drive shaft 50 by the preload applying member 65 to the rolling bearings 62, 63, which support the drive shaft 50. This prevents the drive shaft 50 from being displaced in the axial direction, so that prevention of noise is achieved. There is thus no need to use high precision bearings as rolling bearings to support the drive shaft 50 and this helps reduce the overall cost. Moreover, since there is no need to make the backlash between the worm 9 and the worm wheel 10 smaller than necessary, the steering wheel 2 can be smoothly returned to the straight driving position on completion of a steering operation.

The preload applying member 65, which has the shape of a ring around the drive shaft 50, is located between the motor 8 and the rolling bearing 63 closest to the motor 8 in the housing 21. This makes it possible to fit both the motor 8 and the preload applying member 65 to the housing 21 from the same direction on the assembly line. Since this relieves the assembly operator of any need to change his/her position during the course of assembly, the assembly operation can be performed easily.

The preload applying member 65 and the lock nut 66 does not project outside the housing 21 after the motor 8 is fitted. This prevents a force from acting on the preload applying member 65 from outside the housing 21, so that the preload applying member is prevented from being loosed.

The male threaded section 65a around the outer circumference of the preload applying member 65 is screwed into the female threaded hole 21a", which is concentric with the drive shaft accommodation hole 21", from the side where the motor 8 is located. Furthermore, the inside diameter of the female threaded hole 21a" is equal to or greater than the inside diameter of the drive shaft accommodation hole 21". Both the female threaded hole 21a" and the drive shaft accommodation hole 21" can thus be machined from the same side without the use of a long cutting tool. This makes it possible to increase the precision of concentric machining between the two holes 21", 21a", so that the preload can be applied uniformly in the radial direction.

The preload applying member 65 contacts directly with the rolling bearing 63 closest to the motor 8 from the axial direction. This makes the use of a spacer between the preload applying member 65 and the rolling bearing 63 unnecessary. Thus, the axial displacement of the drive shaft 50 due to the deformation of such a spacer is eliminated, thereby there is no noise even when the drive shaft 50 is subjected to excessive force from the road surface. The requisite number of parts is also reduced.

By inserting the O ring 60 between the inner circumference of the boss 54a on the motor output shaft side and the outer circumference of the drive shaft 50, the relative rotation between the boss 54a and the drive shaft 50 is restrained by the frictional resistance. Therefore, it is possible to eliminate the noise generated by colliding between the teeth of the serration 59 around the inner circumference of the boss 54a and the teeth of the serration 59 around the outer circumference of the drive shaft 50. Moreover, by filling the closed space 61 formed inside the O ring 60 in the boss 54a with grease, it is possible to ensure that the grease is always present in the gap between the teeth of the serration 59 around the outer circumference of the drive shaft 50 and the teeth of the serration 59 around the inner circumference of the boss 54a. Thus, the colliding between the teeth can be prevented, with increasing wear resistance of the teeth over a long period, so that it is possible to significantly reduce the noise due to the colliding.

Moreover, in the embodiment outlined above, the surface of the steel worm 9 is hardened by treating it with nitride. This makes it possible to prevent the worm 9 from wearing, so that there is no need to make the backlash between the worm 9 and the worm wheel 10 unnecessarily tight in anticipation of wear. It is thus possible to return the steering wheel 2 smoothly to the straight driving position on completion of a steering operation. Again, the inhibition of wear also helps prevent a reduction in the efficiency of transmission between the worm 9 and the worm wheel 10.

In the embodiment outlined above, the third shaft section 3c of the steering shaft 3, around which the worm wheel 10 is fitted, is supported by two ball bearings 26, 27 at two separate points along the axial direction. The inner ring of one of the ball bearings 27 is sandwiched between the step 3c∝ around the outer circumference of the third shaft section 3c and a nut 29 screwed onto the third shaft section 3c. This serves to inhibit axial displacement of the third shaft section 3c with respect to the housing 21. It is thus possible to prevent the backlash between the worm wheel 10 and the worm 9 becoming unnecessarily small as a result of the axial displacement of the steering shaft 3. This makes it possible to return the steering wheel 2 smoothly to the straight driving position on completion of a steering operation.

The present invention is not limited to the embodiment outlined above. For example, although the boss on the side of the output shaft of the motor and the drive shaft are linked through the teeth of the serrations in the above embodiment, the link can be equally accomplished with the help of spline teeth.

What is claimed is:

1. A motor-operated power steering device, comprising:
   a housing having a motor fitting opening;
   a motor for generating power to assist steering, the motor being fitted to the housing so as to close the motor fitting opening;
   a drive shaft which can be rotated by the motor, the drive shaft having first and second flanges;
   a drive shaft accommodation hole formed in the housing so as to communicate with the motor fitting opening;
   first and second rolling bearings for supporting the drive shaft at two separate points surrounding both the first and second flanges along the axial direction in the drive shaft accommodation hole the first and second rolling bearings including:
   (a) first and second inner rings that contact the first and second flanges, respectively;
   (b) first balls and second balls respectively; and
   (c) first and second outer rings contacting the housing and a pre-load applying member, respectively;
   a driving gear provided around the circumference of the drive shaft;
   a driven gear that meshes with the driving gear;
   a steering shaft linked to the driven gear;
   a female threaded hole, formed in the housing concentrically with the drive shaft accommodation hole, in a space between the motor and the first and second rolling beatings;
   the pre-load applying member, formed in the shape of a ring around the outside of the drive shaft and having a male threaded section formed around its outer circumference so as to be screwed into the female threaded hole in the housing so that a pre-load can be applied along the axial direction from the pre-load applying member through: the second outer ring, the second balls, the second inner ring, the second flange, the drive shaft, the first flange, the first inner ring, the first balls, and the first outer ring, to the housing, so as to prevent axial displacement of the drive shaft and rolling bearings; and
   a lock nut that is screwed onto the male threaded section around the outer circumference of the pre-load applying member.

2. The motor operated power steering device according to claim 1, wherein:
   an inside diameter of the female threaded hole is equal to or greater than an inside diameter of the drive shaft accommodation hole.

3. A motor-operated power steering device, comprising:
   a housing having a motor fitting opening;
   a motor for generating power to assist steering, the motor being fitted to the housing so as to close the motor fitting opening;
   a drive shaft that can be rotated by the motor;
   a drive shaft accommodation hole formed in the housing so as to communicate with the motor fitting opening;
   first and second rolling beatings for supporting the drive shaft at two separate points along the axial direction in the drive shaft accommodation hole;
   a driving gear provided around the circumference of the drive shaft;
   a driven gear that meshes with the driving gear;
   a steering shaft linked to the driven gear;
   a female threaded hole, formed in the housing concentrically with the drive shaft accommodation hole, in a space between the motor and the first and second rolling bearings;
   a pre-load applying member, formed in the shape of a ring around the outside of the drive shaft and having a male threaded section formed around its outer circumference so as to be screwed into the female threaded hole in the housing so that a pre-load can be applied to the first and second rolling bearings along the axial direction;
   a lock nut that is screwed onto the male threaded section around the outer circumference of the pre-load applying member;
   a motor output shaft by which the motor rotates the drive shaft;
   a boss responsive to the motor output shaft and having teeth formed on its inner circumference that link the boss to teeth formed on the outer circumference of the drive shaft to allow transfer of rotation between the boss and the drive shaft; and
   a sealing member for sealing a gap between the inner circumference of the boss and the outer circumference of the drive shaft at a point outside where the teeth are located in the boss, so as to form a grease-filled closed space inside the sealing member and in the boss.

4. A motor-operated power steering device, comprising:
   a housing having a motor fitting opening;
   a motor for generating power to assist steering, the motor being fired to the housing so as to close the motor fitting opening;
   a drive shaft that can be rotated by the motor;
   a drive shaft accommodation hole formed in the housing so as to communicate with the motor fitting opening;
   first an second rolling bearings for supporting the drive shaft at two separate points along the axial direction in the drive shaft accommodation hole;
   a driving gear provided around the circumference of the drive shaft
   a driven gear that meshes with the driving gear;
   a steering shaft linked to the driven gear;
   a female threaded hole, formed in the housing concentrically with the drive shaft accommodation hole, in a space between the motor and the first and second rolling bearings;
   a pre-load applying member, formed in the shape of a ring around the outside of the drive shaft and having a male threaded section formed around its outer circumference so as to be screwed into the female threaded hole in the housing so that a pre-load can be applied to the first and second rolling bearings along the axial direction, wherein an inside diameter of the female threaded hole is equal to or greater than an inside diameter of the drive shaft accommodation hole;
   a lock nut that is screwed onto the male threaded section around the outer circumference of the pre-load applying member;
   a motor output shaft by which the motor rotates the drive shaft;
   a boss, responsive to the motor output shaft and having teeth formed on its inner circumference that link the boss to teeth formed on the outer circumference of the drive shaft to allow transfer of rotation between the boss and the drive shaft; and a sealing member for sealing a gap between the inner circumference of the boss and the outer circumference of the drive shaft at a point outside where the teeth are located in the boss, so as to form a grease-filled closed space inside the sealing member and in the boss.

* * * * *